UNITED STATES PATENT OFFICE.

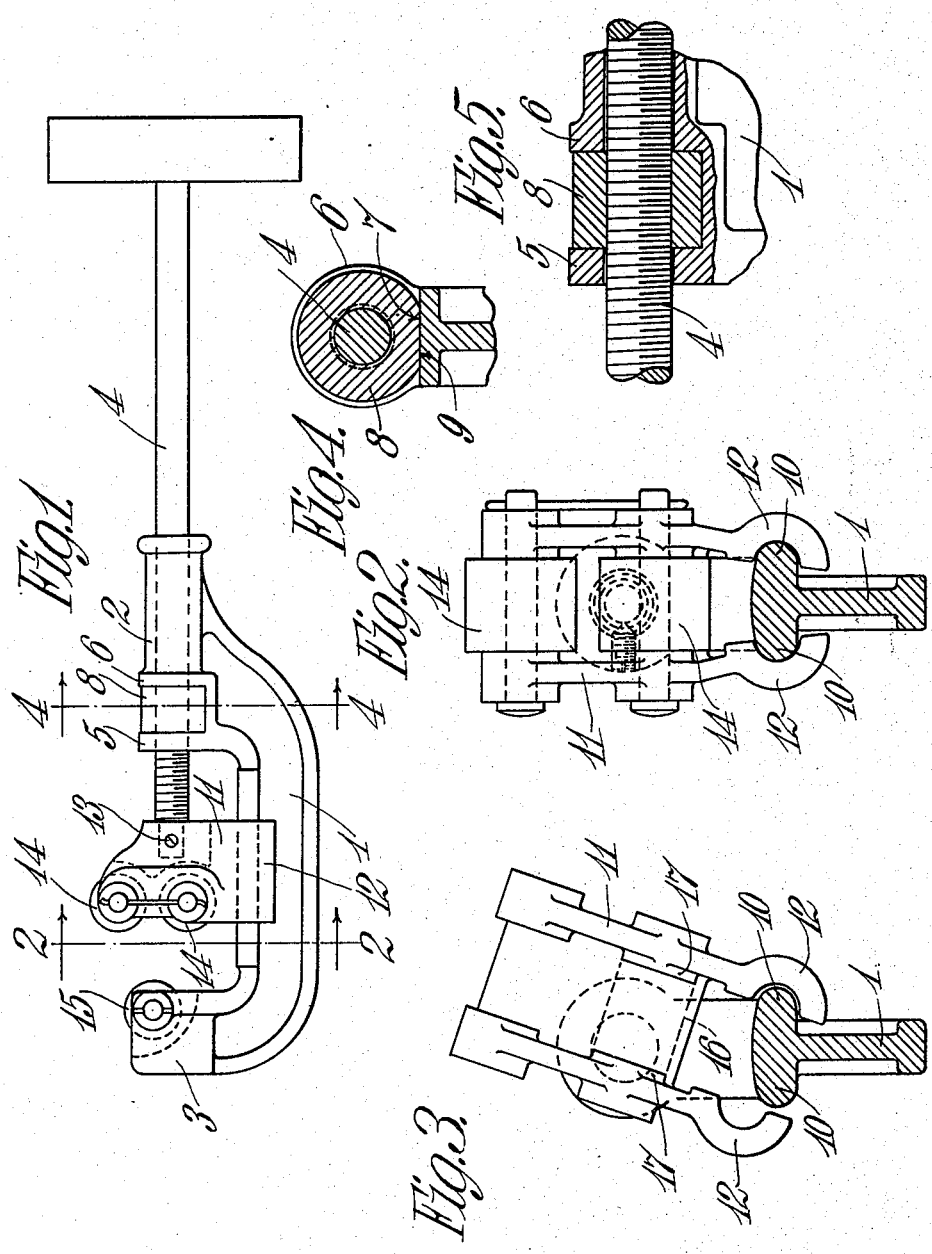

FREDERIC E. WELLS, OF GREENFIELD, MASSACHUSETTS.

PIPE-CUTTER.

1,166,505.  Specification of Letters Patent.  Patented Jan. 4, 1916.

Application filed July 29, 1915. Serial No. 42,563.

*To all whom it may concern:*

Be it known that I, FREDERIC E. WELLS, a citizen of the United States of America, residing in Greenfield, county of Franklin, and State of Massachusetts, have invented certain new and useful Improvements in Pipe-Cutters, of which the following is a specification.

This invention relates to improvements in pipe cutters and similar tools, and particularly to tools which employ a head slidable on ways.

Heretofore, as far as I am aware, the slidable heads of pipe cutters have been made in two parts to permit the placing of the head upon the ways. The head is usually formed to engage the top, bottom and sides of the ways and the latter are frequently T-shaped. Obviously, with such conditions, either the head or ways must be in two parts unless some unusual structure is provided in order that the head may be placed upon the ways. To make the parts described in two or more pieces involves machine work of some sort to properly secure the parts in coöperative engagement with the ways.

A demand has arisen for tools of low price, which will be suitable for ordinary work, and in providing tools of this character, it is necessary to simplify the structure as much as possible. Particularly, the amount of machine work necessary must be reduced to a minimum as this item is the most expensive one in the manufacturing arts.

The object of this invention is to provide a pipe cutter or like tool in which the structure is so simplified and improved that a minimum amount of machining operations are required.

More particularly, an object of the invention is to provide a head for the cutter and a frame having ways upon which the former is arranged to slide, wherein both parts are one piece structures.

Another object is to provide a pipe cutter having a one-piece frame formed with a hole to loosely fit a threaded rod, a slot in the frame intersecting with the hole and an interiorly threaded hardened bushing arranged to fit in said slot to engage said rod, wherein the walls of said slot are arranged to hold the bushing against axial and turning movements.

Another object is to provide in a device having substantially T-shaped ways a head having integral depending extensions of malleable material which are arranged to freely fit over said ways and later to be secured thereto in coöperative relation by bending or deformation of the material.

With these objects in view one preferred embodiment of the invention is shown, for illustrative purposes, in the accompanying drawings, in which:

Figure 1 is a side elevational view of a pipe cutter showing the invention as applied thereto; Fig. 2 is a cross sectional view taken on the line 2—2 of Fig. 1 and looking in the direction of the arrows; Fig. 3 is a view taken similarly to Fig. 2, showing the manner of assembling the sliding element on the frame; Fig. 4 is a cross sectional view taken on the line 4—4 of Fig. 1 and looking in the direction of the arrows; and Fig. 5 is a partial longitudinal section of Fig. 1.

Referring to these drawings in detail—1 represents the frame of the pipe cutter, which is substantially U-shaped and has upwardly extending portions 2 and 3. The portion 2 forms a bearing for the usual threaded rod 4 by means of which the cutter is manipulated. The bearing portion 2 has near one end thereof with a slot formed by spaced wings 5 and 6 the flat surface 7 of frame 1. Within this slot is a hardened interiorly threaded bushing 8, which engages with the threads on the rod 4. This bushing has a cut away portion 9 which engages with the surface 7 to prevent revolution of the bushing 8 in a manner clearly shown in Fig. 4. The bushing is held axially between and by the spaced walls as shown in Figs. 1 and 5.

The frame or guideway 1 is substantially T-shaped in cross section and has wings 10 which form ways with convex side edges. (See Fig. 2). Slidably mounted on the latter is a head or slide 11 which has integral downwardly extending concave extensions 12 on either side thereof to engage the ways 10. The inner end of the rod 4 is connected to the member 11 by a set screw 13 in such a manner that the rod is freely revoluble with the head or slide 11 but is held from axial movement relative thereto. The head 11 revolubly supports the usual pair of spaced rolls 14. Rotatably mounted in the arm 3 of frame 1 is the usual cutter wheel 15.

The operation of the device is too well known to need extended description. The rod 4 when turned, moves relatively to the bushing 8, and thus frame 1, forcing the rolls 14 toward the cutter 15. The rolls 14 force the pipe to the cutter 15 and, when the frame 1 is revolved around the pipe by using the rod 4 as a handle, the pipe may be cut off.

It is particularly to be noted that the slide or head 11 and extensions 12 are integral parts of a one piece member and the latter is preferably a malleable casting but may be formed of any other suitable material which is malleable. The extensions 12, as clearly shown in Fig. 3 are spaced sufficiently to permit them to be placed over the convex ways 10. Thereafter, these extensions are forced inwardly to grip the ways 10 as shown in Fig. 2. During the process of hammering the extensions 12 into engagement with the ways, a block 16 is inserted between the bosses 17, as indicated in dotted lines in Fig. 3, so that the deformation of the material will occur in the lower portion of the head and not cause a binding action upon the rolls 14.

It will thus be seen that by the provision of a head having malleable extensions, the head or slide may be applied quickly and in an inexpensive manner to the ways on which it slides. The head requires no machine work other than that for mounting the rolls, which is necessary in any case. By the provision of the bushing 8, the necessity for threading the frame 1 is avoided. Moreover, the bushing may be hardened while the frame, which is preferably a drop forging, cannot be hardened. Thus the structure is not only simplified but improved as the wearing qualities of the bushing are far superior to those of the frame.

Thus, I have provided a simple and improved structure for a pipe cutter or like tool which is exceptionally cheap to manufacture and yet is strong and durable.

It is recognized that many changes may be made in the structure described without departing from the scope of my invention which is defined in the appended claim.

What I claim is:

The described method of forming and assembling the carrying elements of a pipe cutter which comprises forming (1) a guideway, T-shaped in cross section and having convex side edges, and (2) a slide for carrying rollers having spaced depending inwardly concave extensions; bringing the guideway and slide into the required relative positions and interposing a spacing block of the required shape and size; and finally, forcing the depending extensions toward each other and into gripping and sliding engagement with the side edges of the guideway.

FREDERIC E. WELLS.